United States Patent [19]

Hayashi et al.

[11] Patent Number: 4,497,001

[45] Date of Patent: Jan. 29, 1985

[54] AUTO-REVERSE MECHANISM FOR USE IN MAGNETIC RECORDING/REPRODUCING APPARATUS

[75] Inventors: Hideki Hayashi; Sadayoshi Endo; Yukio Ito; Satoshi Takagi, all of Tokyo, Japan

[73] Assignee: Clarion Co., Ltd., Tokyo, Japan

[21] Appl. No.: 396,186

[22] Filed: Jul. 8, 1982

[30] Foreign Application Priority Data

| Jul. 10, 1981 | [JP] | Japan | 56-107744 |
| Jul. 10, 1981 | [JP] | Japan | 56-107745 |
| Jul. 10, 1981 | [JP] | Japan | 56-107746 |
| Jul. 10, 1981 | [JP] | Japan | 56-107747 |
| Jul. 14, 1981 | [JP] | Japan | 56-103444[U] |
| Jul. 14, 1981 | [JP] | Japan | 56-103445[U] |

[51] Int. Cl.³ .................................... G11B 15/44
[52] U.S. Cl. .................................... 360/74.2
[58] Field of Search ............... 242/186, 191; 360/74.1, 360/74.2, 74.3

[56] References Cited

FOREIGN PATENT DOCUMENTS 58-9249  1/1983 Japan ................. 360/74.2
2079514  1/1982 United Kingdom ............. 360/74.1

Primary Examiner—George G. Stellar
Attorney, Agent, or Firm—Flynn, Thiel, Boutell & Tanis

[57] ABSTRACT

An auto-reverse mechanism intended for use in a magnetic recording/reproducing apparatus, comprising a means of changing driving force to reel base, means of detecting stopped rotation of said reel base, means of rotating, in response to the operation of said detection means, a power gear provided with intermittent gear section, means of actuating the driving-force changing means and a change plate under the effect of the rotation of said power gear, claw formed integrally with said change plate and having the effect of a spring, and a control hole in which the claw is fitted, the reaction force developed at said claw when the change plate is actuated being utilized as attractive force to the intermittent gear section for making the power gear engage with the other gears.

8 Claims, 20 Drawing Figures

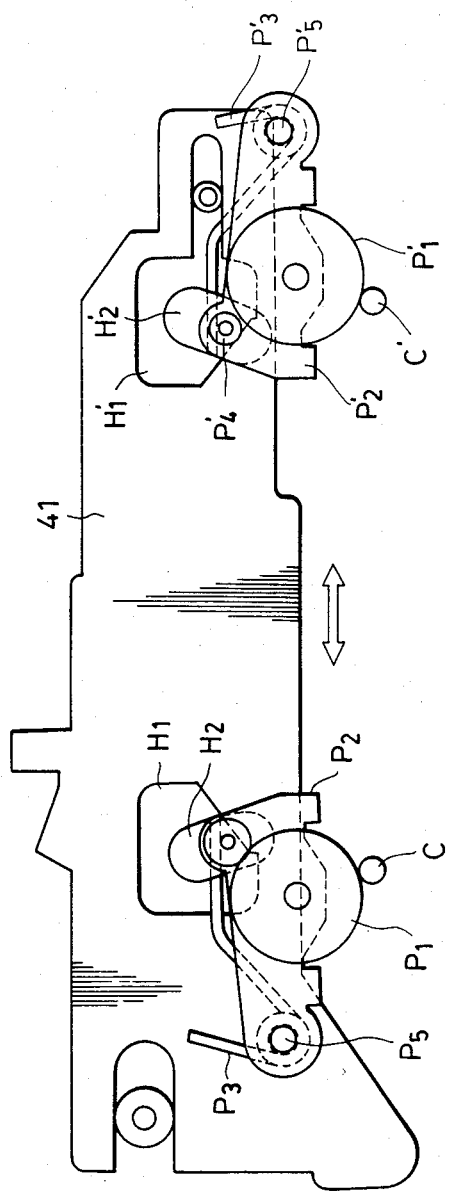

FIG. 9(a)
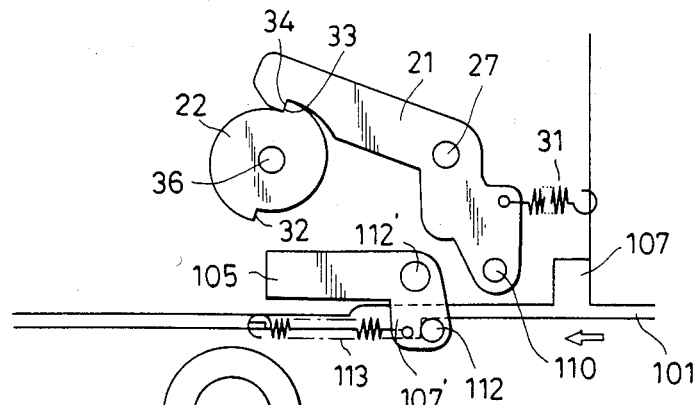
FIG. 9(b)
FIG. 9(c)
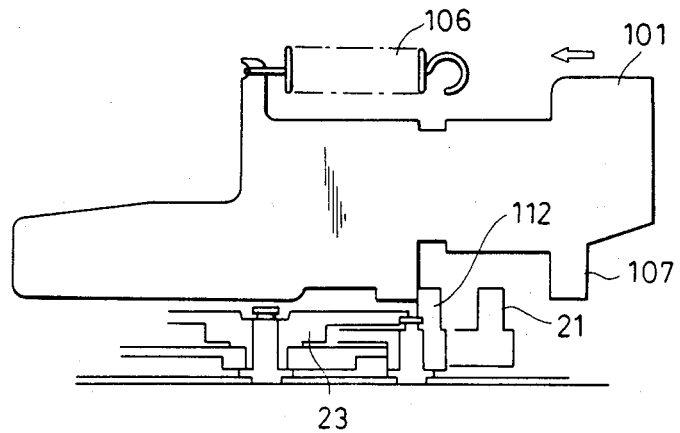

AUTO-REVERSE MECHANISM FOR USE IN MAGNETIC RECORDING/REPRODUCING APPARATUS

BACKGROUND OF THE INVENTION

1. Field of the Invention

The present invention relates to a magnetic recording/reproducing apparatus, and more particularly to the improved auto-reverse mechanism which is suitably adoptable in a tape player mounted on board in a car, such as car stereo set.

2. Description of the Prior Art

In some prior-art auto-reverse mechanisms intended to be used in tape players or the like mounted on board in automobiles, the driving force to the reel base is changed by the power gear with an intermittent gear section which is driven by a motor in response to the operation of reverse. In such auto-reverse mechanism, the power gear is provided with the intermittent gear section, as described above, to interrupt once the power upon completion of the reverse operation; however, it is necessary to impart an attractive force to the intermittent gear section for the purpose of placing the power gear into engagement with other gears so that it will not be turned again after the power is interrupted.

To this end, it has been proposed to arrange springs S1 and S2 in such a manner as to engage a power transmission plate PT pivotably mounted on the power gear PG to impart the attractive force to the intermittent gear section G, as shown in FIG. 6(a). H in this Figure indicates an elongated hole formed in the power transmission plate PT, in which an eccentric pin P of the power gear PG is slidably fitted. Otherwise, as shown in FIG. 6(b), there is provided a pivoted link R of which the one end is engaged with the power transmission plate PT while the other end is engaged with the spring S, thus imparting the attractive force to the intermittent gear section.

In any case, a member is necessary for imparting the attractive force to the intermittent gear section, which leads to problems as to the space, number of parts, etc.

SUMMARY OF THE INVENTION

Accordingly, the present invention is proposed to overcome the drawbacks of the prior art, and it has the object to provide an auto-reverse mechanism which is so constructed as to produce a reaction force when the change plate, one of the components of the auto-reverse mechanism, which reaction force being utilized to impart the aforementioned attractive force to the intermittent gear section of the power gear.

The foregoing and other objects and advantages of the present invention will be better understood from the ensuing description made by way of example of the embodiments as title of example in reference with the accompanying drawings.

BRIEF DESCRIPTION OF THE DRAWINGS

FIGS. 9(a), (b) and (c) are also schematic views, respectively, of a further embodiment of the present invention.

DETAILED DESCRIPTION OF THE PREFERRED EMBODIMENTS

First, the magnetic-tape end (stopped-rotation-of-reel-base) detector which is to automatically start the auto-reverse mechanism according to the present invention will be explained.

Figure 1:
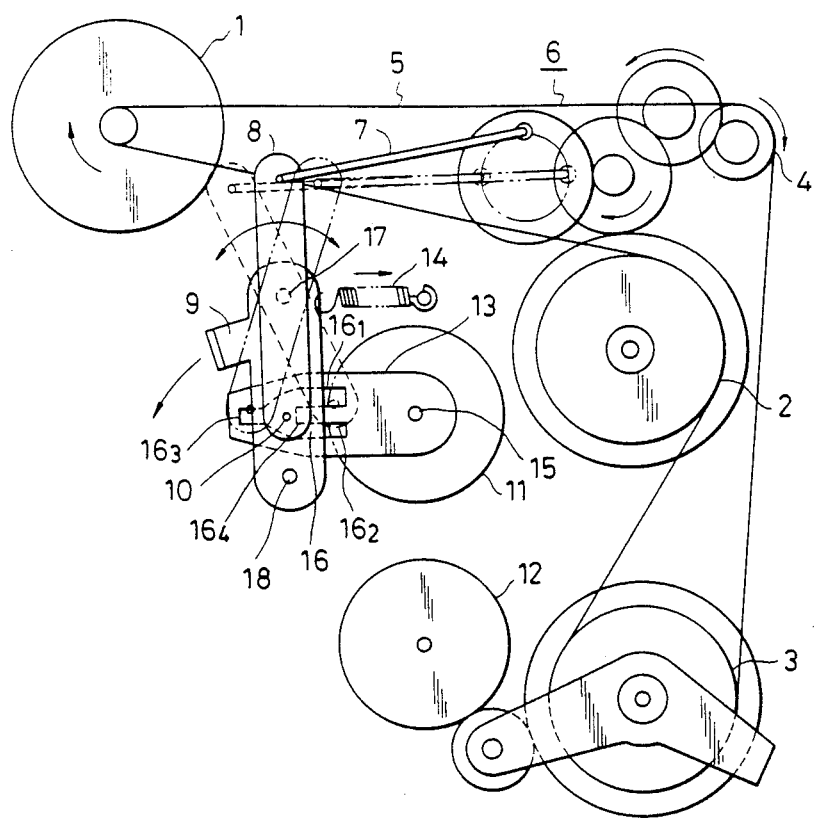
FIGS. 1 and 2 are schematic views of magnetic-tape end detectors, respectively.

Referring now to FIG. 1 showing one example of the above-mentioned detector, the numeral 1 denotes a motor; 2 and 3 indicate flywheels, respectively; 4 is a tension pulley; 5 is a belt; 6 is a reduction gear; 7 is a crank arm; 8 is a first lever; 9 is a second lever; 10 is an engagement pin; 11 and 12 are reel bases; 13 indicates an oscillating member; and 14 is a spring.

The oscillating member 13 is oscillatably mounted on a pivot 15 of the reel base 11 (or 12), and it has formed therein a Y-shaped recess 16 in which the engagement pin 10 provided projecting at one end of the first lever 8 is so engaged as to be freely movable; the other end of the lever 8 is coupled with the crank arm 7. In addition, the first lever 8 is coupled with the second lever 9 by means of a pivot 17 in such a manner that the lever 8 is always pivotable about the pivot 17 and both the levers 8 and 9 are pivotable together when the reel base is stopped from rotating, as will be described later.

The spring 14 is engaged with the second lever 9 which is thus pivotable about the pivot 18.

The revolution of the motor 1 is transmitted by means of the belt 5 to the reel base driving flywheels 2 and 3, and to the tension pulley 4 of which the rotation in turn will cause the crank arm 7 to be reciprocally moved by means of the reduction gear 6. Under the effect of the reciprocal movement of the crank arm 7, the first lever 8 is pivoted about the pivot 17 as shown while the reel base 11 is being rotated, so that the engagement pin 10 of the lever 8 moves freely along the recess 16 in the oscillating member 13, namely, along the first recess portion $16_1$ when the reel base 11 is in the position for takeup of the magnetic tape, while the oscillating member 13 is oscillated about the rotating shaft of the reel base 11.

When the rotation of the reel base 11 is stopped as the result of the takeup of tape to full extent, the engagemnt pin 10 is moved from the first recess portion $16_1$ into the third portion $16_3$ where it abuts once the end thereof thereby so positioning the oscillating member 13 as to be generally perpendicular to the first lever 8. Then, the pin 10 abuts the protrusion-shaped portion $16_4$ corresponding to the third recess portion $16_2$, whereby the first lever 8 is pivoted about the engagemnt pin 10 while the second lever 9 pivots about the pivot 18 together with the first lever against the biasing force of the spring 14, so that the rotation of the reel base 11 is stopped, thus the end of the magnetic tape can be detected. More particularly, the auto-reverse mechanism is actuated in response to the pivotment of the second lever 9.

Figure 2:
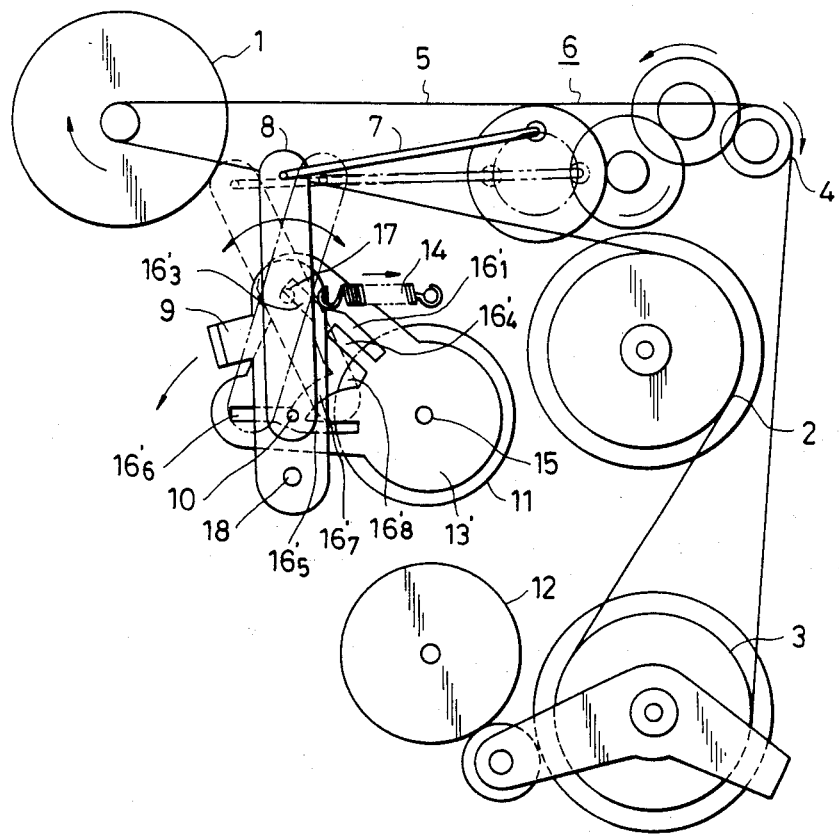

FIG. 2 schematically illustrates another magnetic-tape end detector according to the present invention; in this Figure, the numerals similar to those in FIG. 1 indicate the parts or members identical or similar in function to those in FIG. 1, except for the oscillating member 13' which is different from that in FIG. 1; the portion of this member corresponding to the second recess portion as shown in FIG. 1 is deformed as shown in FIG. 2. That is, the first recess portion $16'_1$, third portion $16'_3$ and protrusion-shaped portion $16'_4$ have generally the same shapes as those in FIG. 1, while the portion corresponding to the second recess portion in FIG. 1 consists of a fourth portion $16'_5$, fifth portion $16'_6$, sixth portion $16'_7$ and the seventh portion $16'_8$.

In the example shown in FIG. 2, when the reel base 11 is in the position for takeup of the tape, the stopped rotation thereof is detected as in the example shown in FIG. 1; however, when the reel base 11 is in the position for supply of the tape, the detection of the stopped rotation will be made as follows:

First, the engagement pin 10 moves from the fourth recess portion $16'_5$ into the fifth portion $16'_6$ and abuts the end of the latter. Once the pin 10 positions the oscillating member 13' generally perpendicular to the first lever 8, it will move along the sixth recess portion $16'_7$ which is arch-shaped as shown. As the pin 10 moves along this recess portion, the oscillating member 13' is made to pivot in the direction of arrow. Further, the engagment pin 10 moves via the seventh portion $16'_8$ to the third portion $16'_3$ and abuts the end of the latter, thus positioning the oscillating member 13' generally perpendicular to the first lever 8; then, the pin 10 abuts the protrusion-shaped portion $16'_4$ about which in turn the first lever 8 is pivoted to cause the second lever 9 to be pivoted against the biasing force of the spring 14.

Figure 3:
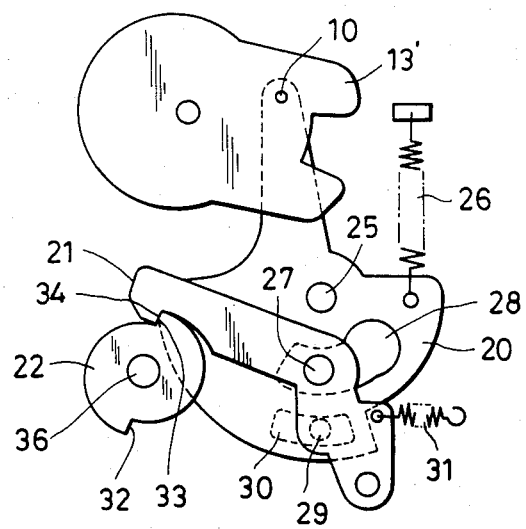
FIGS. 3(a), (b) and (c) are also schematic views, respectively, of the power transmission for use with the auto-reverse mechanism according to the present invention.
Figure 3:
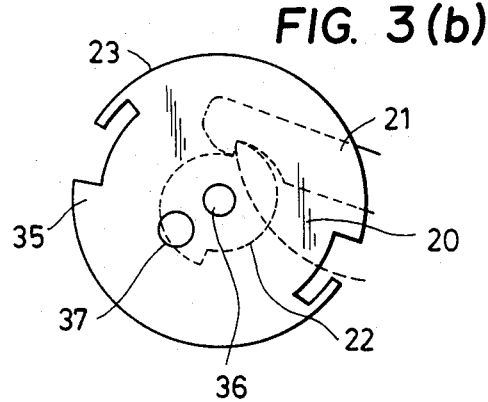
Figure 3:
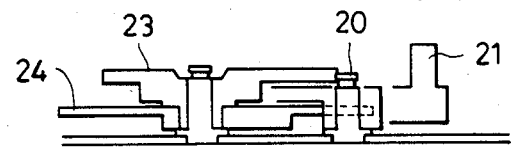

Referring to FIG. 3, there is schematically shown a power transmission intended to be used in the auto-reverse mechanism, adopting the above-mentioned principle of tape-end detection; in this Figure, the numeral 20 indicates a check plate; 21 is a lock link; 22 is a cam; 23 is a power gear; and 24 is an oscillating gear. The check plate 20 is pivotably mounted on the pivot 15 and has provided at the end thereof the pin 10 whichis freely movably engaged in the tape-end detecting recess (not shown since it is the same as that in FIG. 2) formed in the oscillating member as described above, and the pin 10 is applied with a biasing force in the counterclockwise direction by the spring 26. The member 13' may be the member 13 shown in FIG. 1.

The lock link 21 is pivotably mounted on the pivot 27 through the first recess 28 formed in the check plate 20, and has provided on the rear side thereof a pin 29 which is freely movably engaged in the second recess 30 formed also in the check plate 20, said pin 29 being applied with a counterclockwise biasing force from the spring 31.

The cam 22 has locking engagement portions 32 and 33 on one 32 of which the claw 34 of the lock link 21 is always engaged.

The power gear 23 is provided with an intermittent gear section 35 and has provided at a position eccentric from the pivot 36 a pin 37. The oscillating gear 24 is provided to oscillate the check plate 20. The gears 23 and 74 and the cam 22 are coaxially disposed and driven by the motor (not shown).

Assume here that the reel base 11 is stopped from rotating when the end of magnetic tape is detected, as described in the above, the check plate 20 is pivoted somewhat clockwise against the biasing force of the spring 26, whereby the lock link 21 abuts at the pin 29 thereof on the one end face of the second recess 30 in the check plate 20 and is pivoted somewhat clockwise against the biasing force of the spring 31 so that the claw 34 of the lock link 21 is released from the locking engagement portion 32 of the cam 22.

Thus, the power gear 23 is rotated about a half turn while the check plate 20, and consequently the lock link 21, is returned; at this time, the locking engagement portion 33 of the cam 22 is blocked by the claw 34.

In this manner, the power gear is securely locked at every half turn at the end of tape, thus auto-reverse operation is made by actuating the means of changing the driving force to the reel base by means of the pin 37.

Referring now to FIG. 9, there is illustrated the detail of the locking mechanism for the above-described power gear. The construction of this mechanism is such that two lock links are selectively engaged with the cam pivotably mounted coaxially with the power gear, to lock the power gear, thereby assuring the reverse operation and preventing any failure of reverse.

In FIG. 9, the numeral 101 indicates a change lever; 105 is a second lock link; 100 is a gear which is always rotated clockwise and so disposed as to be in mesh with the power gear 23. The power gear 23 has a slight force of rotation in the counterclockwise direction. A return spring 106 engages the change lever 106 which, when pushed in in the direction of arrow, is movable against the biasing force of the spring 106; the change lever 101 is provided with claws 107 and 107'.

The first lock link 21 is pivotably mounted on the pivot 108.

The second lock link 105 is pivotably mounted on the pivot 112' and is provided at the read end thereof with a pin 112 which is applied with such a clockwise biasing force from the spring 113 that it is forced to the claw 107'.

Figure 10:
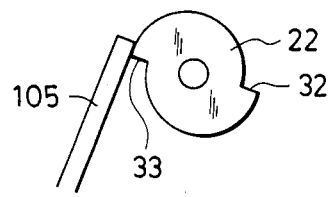
FIGS. 10(a), (b) and (c) explain the function of the embodiment in FIG. 9.
Figure 10:
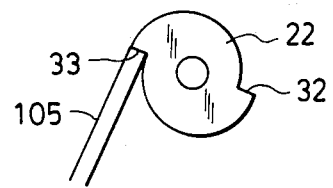
Figure 10:
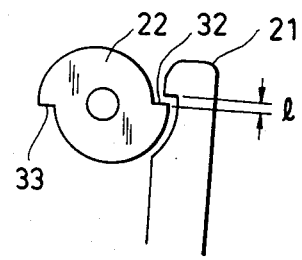

Assume here that the change lever 101 is pushed in to some extent. The pin 112 leaves the claw 107' so the second lock link 105 is pivoted clockwise and abuts the cam 22 as shown in FIG. 10(a). As the change lever 101 is further pushed in, the claw 107 abuts on the pin 110 so that the first lock link 21 will be pivoted clockwise against the biasing force of the spring 31. Thus, the claw 34 of the link is disengaged from the locking engagement portion 33 of the cam 22 which in turn will be unlocked so that the power gear 23 is rotated counterclockwise, whereby the intermittent gear section 35 is engaged with the gear 100 and rotates counterclockwise.

When the power gear 23 rotates about a half turn, the intermittent gear section thereof will cause the disengagement with the gear 100; because of its slight force of rotation in the counterclockwise direction, however, the power gear 23 will be rotated in that direction. Thus, the locking engagement portion 33 of the cam 22 is engaged with the second lock link 105 as shown in FIG. 10(b), and the cam is thus locked. If the change plate is kept pushed in this condition, since the cam 22 is locked as mentioned above, the power gear 23 will not rotate. This is true for the case that the change lever 101 is gradually pushed in.

Next, when the change lever 101 starts returning, first the claw 107 returns while abutting the pin 110 so that the first lock link 21 is pivoted counterclockwise and the claw 34 of the link 21 abuts the cam 22 with a slight clearance 1 remained with respect to the locking engagement portion 32 as shown in FIG. 10(c); when the change lever 101 is returned further, the claw 107' abuts the pin 112 to let the second lock link 105 rotate counterclockwise against the biasing force of the spring 113 so as to leave the lock engagement portion 33, thus the cam 22 is unlocked. Accordingly, the power gear 23 is rotated somewhat counterclockwise for the above-mentioned clearance 1 so that the locking engagement portion 32 of the cam 22 is blocked by the claw 34 of the first lock link 21; thus, the cam 22 is locked.

Figure 4:
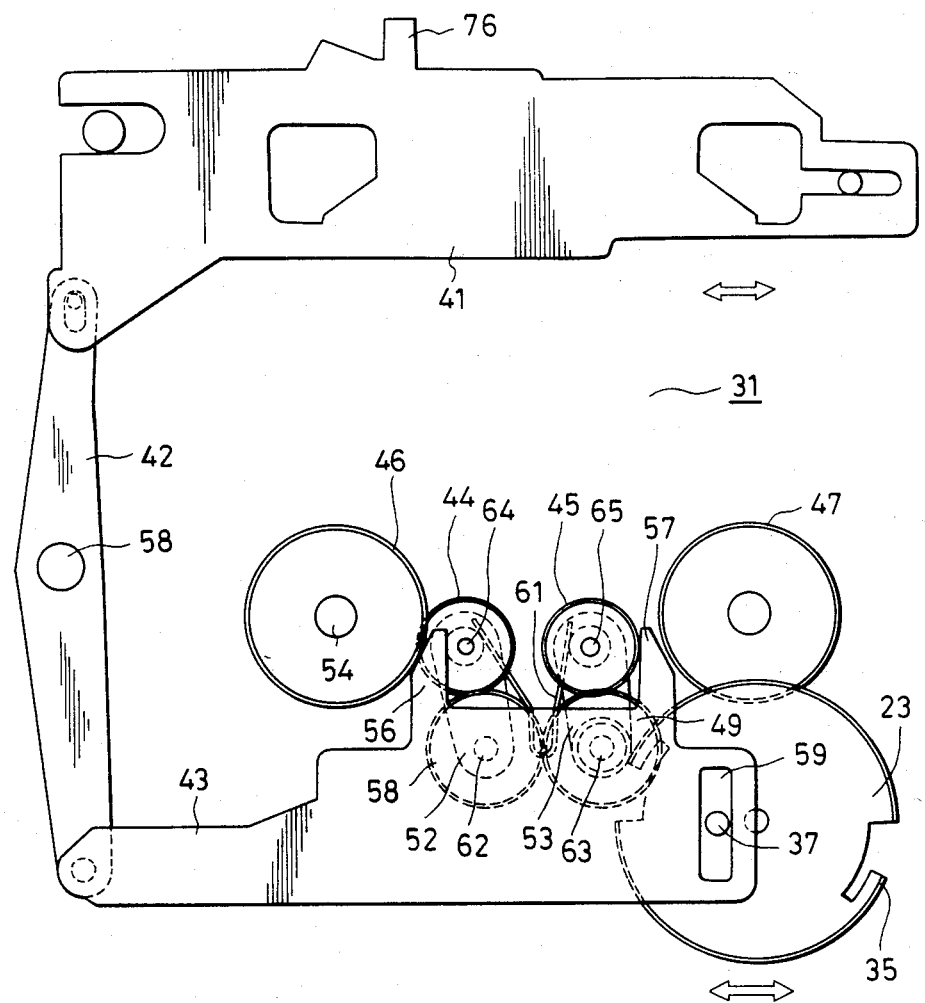
FIGS. 4(a) and (b) are schematic views, respectively, of an embodiment of the present invention.
Figure 4:
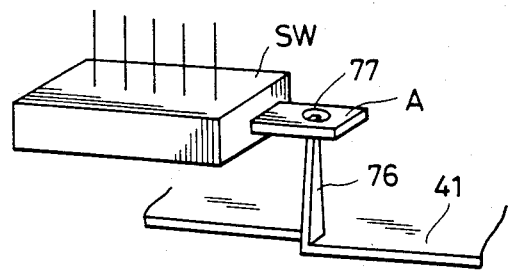
Figure 6A:
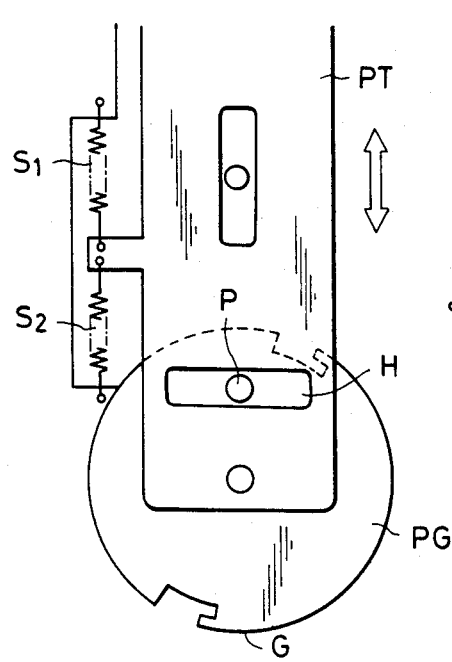
FIGS. 6(a) and (b) are schematic views, respectively, of a conventional system for producing an attractive force for the power gear.
Figure 6B:
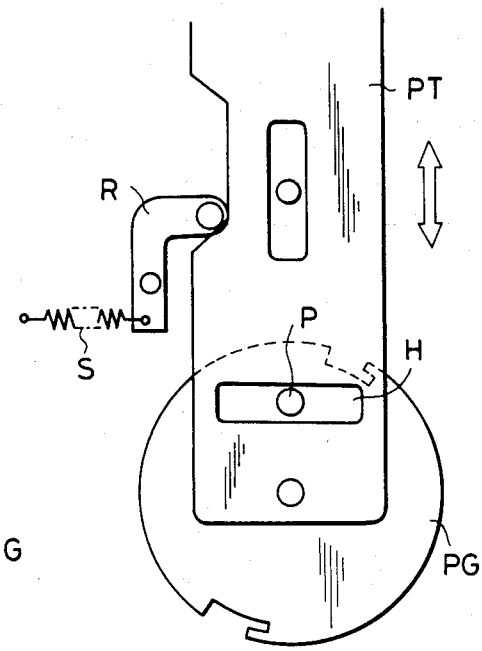
Figure 5:
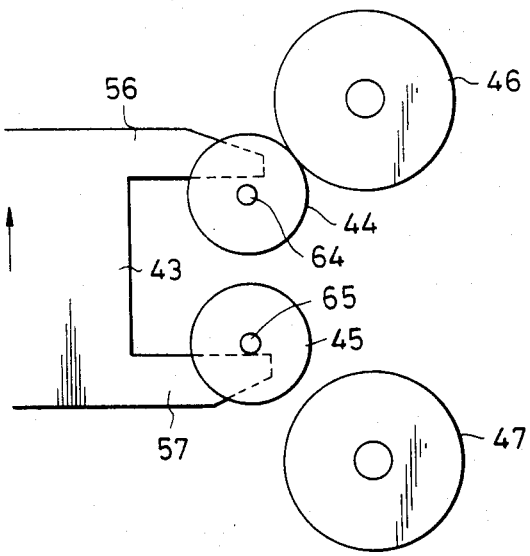
FIGS. 5(a) and (b) are views for explanation of the function of the embodiment shown in FIG. 4.
Figure 5:
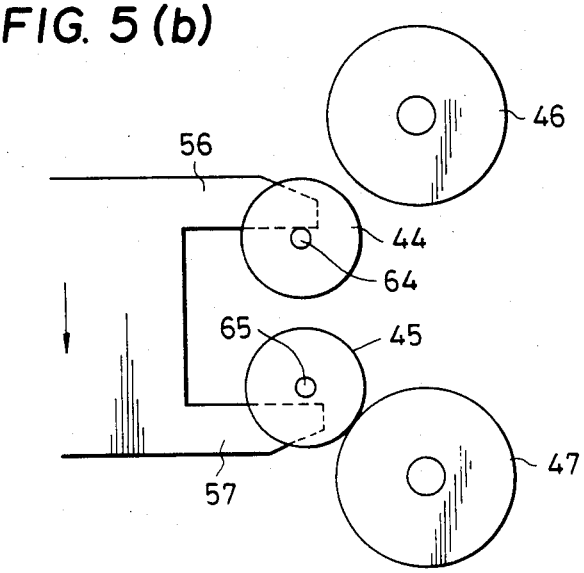

FIG. 4 illustrates the idler changing mechanism as an example of said driving-force changing means; in this Figure, the numeral 41 is a change plate; 42 is a coupling link; 43 is a power transmission plate; 44 and 45 are idlers, respectively; 46 and 47 are reel bases, respectively; 48 and 49 are coupling gears, respectively; 51 is a base plate; 52 and 53 are coupling plates, respectively; 54 and 55 are pivots; and 56 and 57 are changers, respectively.

The change plate 41, coupling link 42 and power transmission plate 43 are disposed along the periphery of the base plate 51; the change plate 41 is supported on the base plate 51 so as to be pivotable in the direction of arrow, and the coupling link 42 is coupled at one end thereof with the change plate 41 and pivotably mounted on the pivot 58 over the base plate 51.

The power transmission plate 43 is coupled at one end thereof with the other end of the coupling link 42, and supported on the base plate 51 so as to be pivotable in the direction of arrow; further, it has formed therein an elongated hole 39 in which the pin 37 of the power gear 23 with intermittent gear section 35 is movably engaged.

The idlers 44 and 45 are in mesh with the coupling gears 48 and 49, respectively, and coupled at the shafts thereof to each other by means of the coupling plates 52 and 53, and they are always so forced by the spring 41 as to engage the reel bases 46 and 47, respectively.

The shafts 62 and 63 of the coupling gears 48 and 49 are fixed to the base plate 51 while the shafts 64 and 65 of the idlers 44 and 45 are just placed on the base plate 51, whereby the idlers 44 and 45 are permitted to pivot along the periphery of the coupling gears 48 and 49 in a certain range against the biasing force of the spring 61.

The power gear 23 is engaged with the coupling gears 48 with which the coupling gear 49 is in mesh. Therefore, the reel bases 46 and 47 are rotated in the respective directions opposite to each other.

Further, the power transmission plate 43 has provided at the upper portions thereof changers 56 and 57, respectively, which are so arranged as to engage the shafts 64 and 65 of the idlers 44 and 45, respectively, depending upon the pivotment of the power transmission plate 43.

It should be noted that the remainder of tape recorder members are omitted for the simplicity of illustration since they are not directly related with the conception of the present invention.

Assume here that the power gear 23 is unlocked. The power gear 23 will be rotated counterclockwise, and also the pin 37 be rotated in the same direction, so that the power transmission plate 43 provided with the elongated hole 35 in which the pin 37 is freely movably engaged is pivoted in the direction of arrow.

For example, when the changer 57 of the power transmission plate 43 is engaged with the shaft 65 of the idler 45, the idler is disengaged from the reel base 47 while the idler 44 gets into engagement with the reel base 46.

When the changer 56 of the power transmission plate 43 is engaged with the shaft 64 of the idler 44 under the effect of the next half-turn rotation of the power gear 23, the engagement between the idler 44 and reel base 46 is released while the idler 45 and reel base 47 are put into engagement with each other.

Thus, by providing the power transmission plate 43 with a switching force by means of the power gear 23, the selection of the idler and reel base in pair is made to effect the reverse operation.

The change plate 41 has formed integrally therewith a claw 76 which has the effect of a spring, as shown in FIG. 4; said claw 76 is fitted in the hole 77 in the pivot A of the slide switch SW.

As mentioned in the above, when the power transmission plate 3 is pivoted by means of the power gear 10, the motion is transmitted by means of the coupling link 2 to the change plate 41 which in turn will be pivoted. In this example, the stroke of the change plate 41 is designed to be exceed the required switching stroke of the slide switch SW; accordingly, when the cnange plate 41 is pivoted in either direction, the claw 76 is subjected to the reaction of the spring to produce a force which will return the change plate 1; this force is transmitted to the power transmission plate 43 via the coupling link 42 and given as attractive force to the intermittent gear section of the power gear.

It will be apparent that the means of transmitting the power to the change plate is not limited the above-mentioned construction; in effect, it may be such that the means of changing the driving force to the reel base can be actuated in response to the operation of reverse.

Further, the above-mentioned claw may be fitted in a control hole smaller than the stroke of the change plate, not only in the slide switch, to produce a reaction of the spring.

Figure 8:
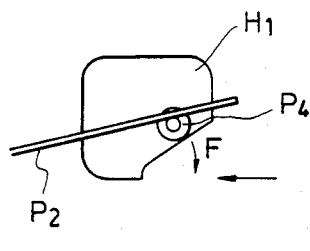
FIG. 8(a) schematically illustrates another embodiment of the present invention.
FIG. 8(b) is an explanatory drawing of the function of the embodiment in FIG. 8(a)
Figure 8:
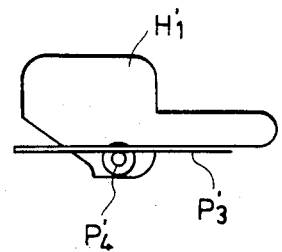
Figure 8:
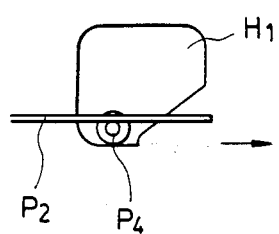
Figure 8:
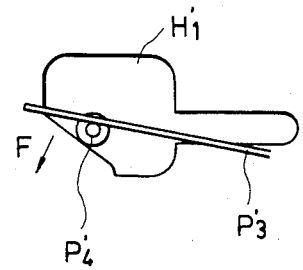

Referring to FIG. 8, of which FIG. 8(a) shows an example construction of the change plate 41 for producing a further attractive force, the references $H_1$ and $H'_1$ are pinch roller selecting holes, respectively, having respective slopes HL and HL'; $P_1$ and $P'_1$ are pinch rollers, respectively, pivotably placed on the roller bases $P_2$ and $P'_2$, respectively. The pinch roller bases $P_2$ and $P'_2$ are pivotably mounted on the pivots $P_5$ and $P'_5$, respectively, around which springs $P_3$ and $P'_3$ are mounted as wound of which the ends are engaged with the pinch roller selecting rollers $P_4$ and $P'_4$, respectively, which are movable in elongated holes $H_2$ and $H'_2$, respectively.

Assume now that the change plate 41 is moved to the left as shown in FIG. 8(b). Then, the roller $P_4$ comes on the slope HL against the biasing force of the spring $P_3$ so that the pinch roller base $P_2$ is pivoted about the pivot $P_5$ and the pinch roller $P_1$ leaves the capstan shaft c.

On the other hand, since the roller $P'_4$ leaves the slope HL', the pinch roller $P'_1$ is forced to the capstan shaft c' under the effect of the biasing force of the spring $P'_3$, theteby permitting the tape to run.

However, the slope HL of the change plate 41 is applied with the reaction force F which will release the pinch roller $P_1$ from the capstan shaft c; therefore, the change plate 41 is subjected to a force which will act in the opposite direction, namely, will cause it to move to the right. This force is transmitted via the coupling link 42 to the power transmission plate 43 so as to make a further contribution as attactive force to the intermittent gear section of the power gear.

Also when the change plate 41 is moved to the right, it is possible to produce the attractive force as shown in FIG. 8(b). The means of transmitting the power to the change plate is not limited to the construction having been described in the above; in effect, it may be such that the means of changing the driving force to the reel base can be actuated in response to the operation of the reel base.

Figure 7:
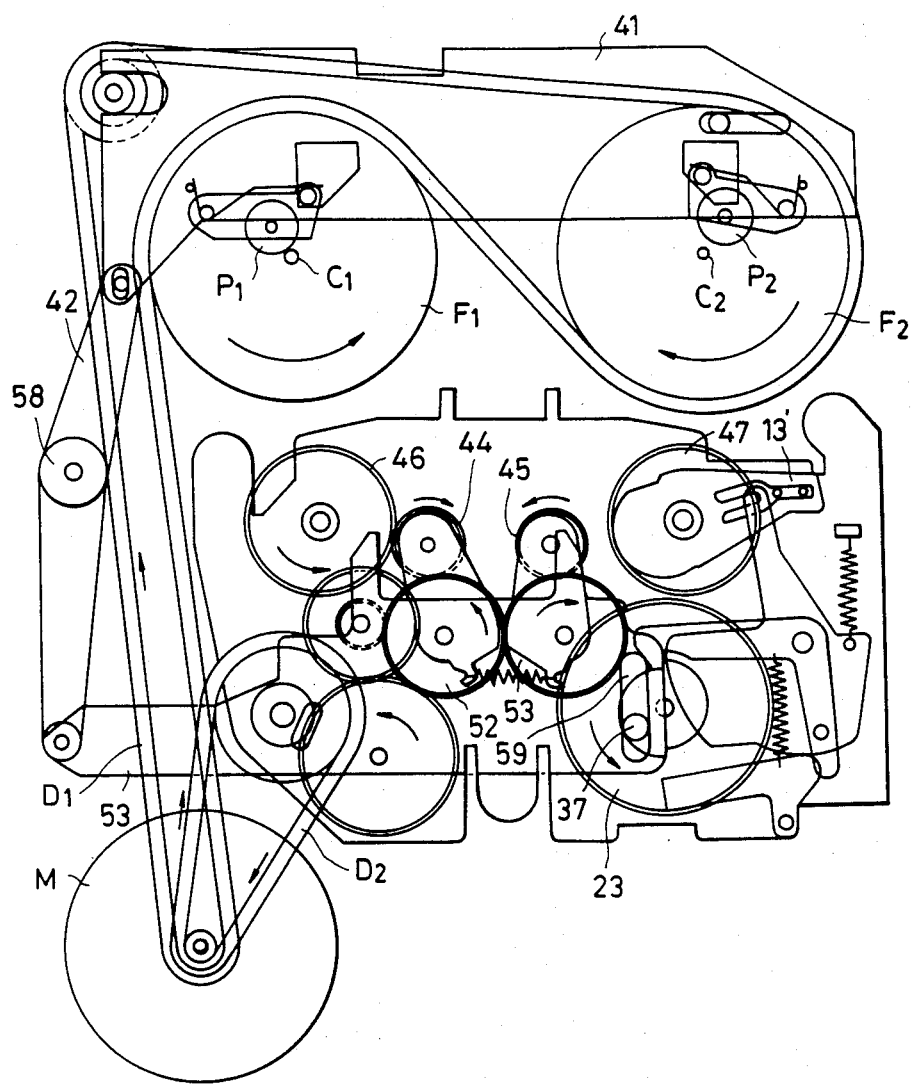
FIG. 7 is a schematic view of a variation of the present invention.

FIG. 7 shows an example in which the mechanisms having been described with reference to FIGS. 3 and 4 are incorporated. In FIG. 7, M is a motor; $D_1$ and $D_2$ are power transmission belts, respectively; $F_1$ and $F_2$ are flywheels; $P_1$ and $P_2$ are pinch rollers; and $C_1$ and $C_2$ are capstans, respectively.

As seen from the foregoing explanation, in the present invention, a claw formed integrally with the change plate and having the effect of spring is utilized for producing the attractive force for the power gear. Therefore, the present invention is advantageous in space saving and reduced number of necessary parts as compared with the prior-art auto-reverse mechanisms.

We claim:

1. An auto-reverse mechanism intended to be used in a magnetic recording/reproducing apparatus, comprising:
   a means for changing the driving force to the reel base of said magnetic recording/reproducing apparatus;
   a means for detecting the stopped rotation of said reel base;
   a power gear provided with an intermittent gear section;
   a means operative in response to the operation of detection of said detection means to rotate said power gear;
   a change plate;
   a means for actuating said changing means and change plate under the effect of the rotation of said power gear;
   a gear for driving said reel base; and
   a means operative in response to the movement of said change plate to attract said intermittent gear section so that said power gear will be engaged with said reel-base driving gear.

2. An auto-reverse mechanism as set forth in claim 1, wherein said attraction means comprises a means for supporting rotatably two pinch rollers of said magnetic recording/reproducing apparatus and which has a spring to provide a biasing force in a direction in which the capstan shaft is always forced to said pinch roller, and two holes with slopes formed on said change plate, said support means being pivoted on said slope, under the effect of the movement of said change plate, against the biasing force of said spring, so that the pinch roller is separated from the capstan shaft; at this time, the reaction force which will be applied to said slope being utilized to attract the intermittent gear section of said power gear.

3. An auto-reverse mechanism as set forth in claim 1 or 2, wherein said attraction means further comprises a claw which has the effect of a spring and a control portion in which said claw is fitted, the reaction force developed on said claw when said change plate is actuated being used to attract the intermittent gear section of said power gear.

4. An auto-reverse mechanism as set forth in claim 1, wherein said rotating means consists of a cam having two locking engagement portions and disposed coaxially with said power gear, a first lock link normally engaged with one of said locking engagement portions, a second lock link and a change lever in response to which said second lock link is made to abut said cam, said first lock link being released from said locking engagement portion of said cam; after said second lock link is blocked by said locking engagement portion of said cam having been rotated through a predetermined angle, said first lock link is made to abut on said cam to release said second lock link from the engagement with said locking engagement portion of said cam so that said first lock link will be blocked by the lock engagement portion of said cam.

5. An auto-reverse mechanism as set forth in claim 1, wherein said changing means comprises a pair of idlers, a power transmission plate which is movable and selectively engages each of said idlers with either of said reel bases, a pin disposed in an eccentric position on said power gear, said pin being fitted freely movably in an elongated hole formed in said power transmission plate.

6. An auto-reverse mechanism as set forth in claim 3, further comprising a switch which is actuated by said claw.

7. An auto-reverse mechanism as set forth in claim 6, wherein said switch is a slide switch, the stroke of said change plate being greater than that of said slide switch.

8. An auto-reverse mechanism as set forth in claim 1, wherein said detection means consists of a check member responsive to the stopped rotation of the reel base at the end of a tape and a gear disposed coaxially with said power gear and which oscillates said check member.

* * * * *